(12) United States Patent
Akaboshi

(10) Patent No.: US 6,912,526 B2
(45) Date of Patent: Jun. 28, 2005

(54) SEARCH APPARATUS AND METHOD USING ORDER PATTERN INCLUDING REPEATING PATTERN

(75) Inventor: Naoki Akaboshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 84 days.

(21) Appl. No.: 10/383,064

(22) Filed: Mar. 7, 2003

(65) Prior Publication Data

US 2003/0195874 A1 Oct. 16, 2003

(30) Foreign Application Priority Data

Apr. 16, 2002 (JP) ............................. 2002-112959

(51) Int. Cl.[7] .................................. G06F 17/30
(52) U.S. Cl. ................... 707/6; 707/4; 707/3
(58) Field of Search ........... 707/1–100, 101–104.1, 707/3, 4, 6; 364/419.02, 419.08, 419.16; 381/43; 704/9

(56) References Cited

U.S. PATENT DOCUMENTS

| 5,510,981 | A | * | 4/1996 | Berger et al. ................. 704/2 |
| 5,978,801 | A | * | 11/1999 | Yuasa ............................ 707/6 |
| 2003/0149562 | A1 | * | 8/2003 | Walther ...................... 704/243 |
| 2003/0187633 | A1 | * | 10/2003 | Fairweather ................... 704/9 |

OTHER PUBLICATIONS

U.S. Appl. No. 10/092,444, filed Mar. 8, 2002, Naoki Akaboshi et al., Fujitsu Limited.

* cited by examiner

*Primary Examiner*—Charles Rones
*Assistant Examiner*—Neveen Abel-Jalil
(74) *Attorney, Agent, or Firm*—Staas & Halsey LLP

(57) ABSTRACT

An order relation extracted from a search pattern query is converted into a deterministic finite automaton (DFA). A process of determining whether or not a state transition can be performed by the DFA using each record, and of registering a transition destination and history information in a state transition set, is repeated, thereby obtaining a combination of records corresponding to the search pattern query.

13 Claims, 14 Drawing Sheets

FIG. 1A  addeabclsfsallfefefeafazzaabababasasfasfalallaallcc

| SYNTAX | MEANING |
|---|---|
| . | ARBITRARY CHARACTER STRING |
| X* | X REPEATEDLY APPEARS 0 OR MORE TIMES |
| X\|Y | X OR Y APPEARS |
| X+ | SEQUENCE OF ONE OR MORE Xs |
| X? | 0 OR ONE X |

A: PC and CAMERA

| RID | PURCHASE DATE | COMMODITY | PRICE |
|---|---|---|---|
| R1 | 2001/1/13 | B | 838 |
| R2 | 2001/1/13 | C | 1800 |
| R3 | 2001/1/13 | D | 838 |
| R4 | 2001/1/15 | A | 700 |
| R5 | 2001/1/15 | B | 1300 |
| R6 | 2001/1/15 | C | 1800 |
| R7 | 2001/1/16 | A | 700 |
| R8 | 2001/1/16 | B | 581 |
| R9 | 2001/1/16 | C | 1800 |
| R10 | 2001/1/20 | A | 700 |
| R11 | 2001/1/20 | D | 1900 |
| R12 | 2001/1/20 | E | 1600 |

FIG. 1G

| EVENT NAME | EVENT DEFINITION | INTER-EVENT DEFINITION |
|---|---|---|
| PP → EVENT1: | (COMMODITY=B) + [REPETITION] | |
| EVENT2: | COMMODITY=C | EVENT2. PURCHASE DATE<=EVENT1. PURCHASE DATE+2 |

FIG. 1H

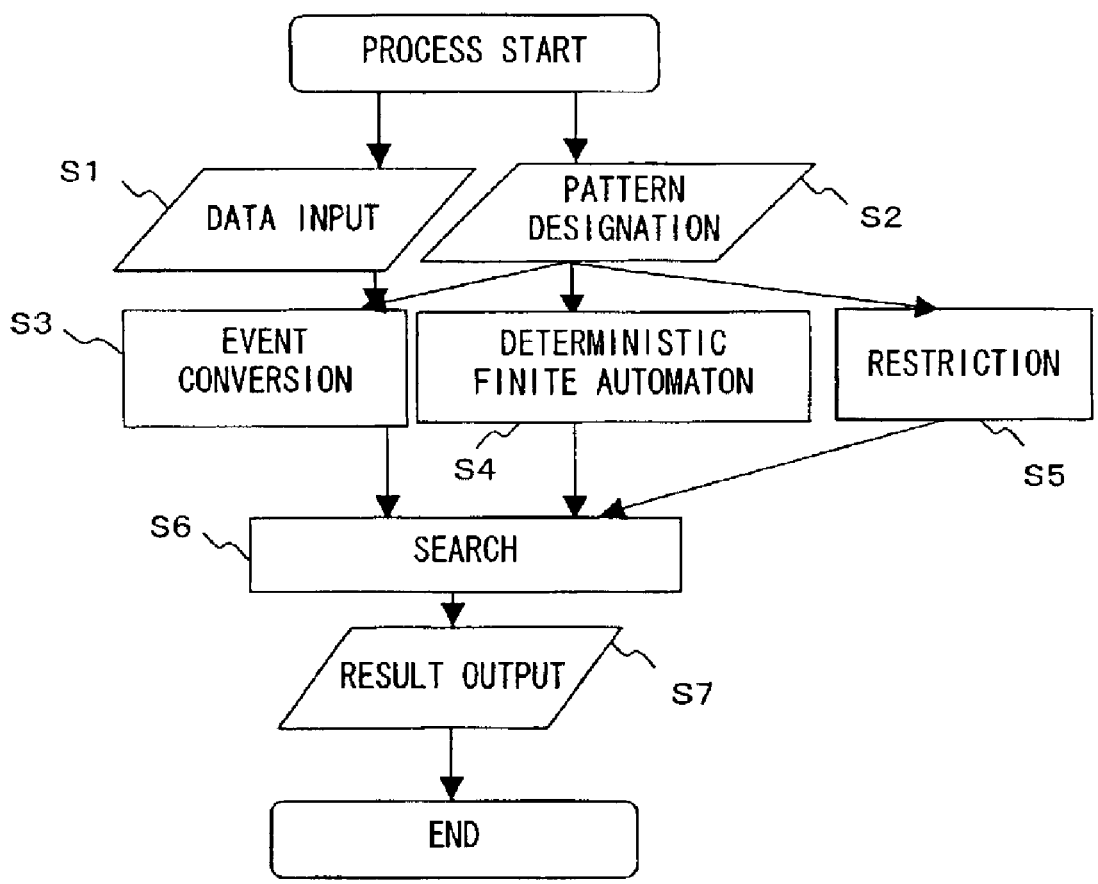
F I G. 3

| CLIENT ID | PURCHASE DATE | COMMODITY | PRICE |
|---|---|---|---|
| 110001001 | 2001/01/13 | A | 838 |
| 110001321 | 2001/01/14 | K | 1300 |
| 110001001 | 2001/01/13 | N | 1800 |
| 110011047 | 2001/01/20 | S | 581 |
| 110001321 | 2001/01/27 | J | 700 |
| 110001001 | 2001/01/28 | B | 838 |
| 110001213 | 2001/01/28 | G | 1600 |
| 110001382 | 2001/01/30 | Y | 2600 |
| 110011047 | 2001/01/31 | I | 1300 |
| 110001478 | 2000/02/01 | M | 1400 |
| 110002438 | 2001/02/01 | A | 838 |
| 110011047 | 2001/02/03 | T | 1300 |

FIG. 8

| CLIENT ID | PURCHASE DATE | COMMODITY | PRICE |
|---|---|---|---|
| 110001001 | 2001/01/13 | A | 838 |
| 110001001 | 2001/01/13 | N | 1800 |
| 110001001 | 2001/01/28 | B | 838 |
| 110001213 | 2001/01/28 | G | 1600 |
| 110001321 | 2001/01/14 | K | 1300 |
| 110001321 | 2001/01/27 | J | 700 |
| 110001382 | 2001/01/30 | Y | 2600 |
| 110001478 | 2001/02/01 | M | 1400 |
| 110002438 | 2001/02/01 | A | 838 |
| 110011047 | 2000/02/03 | T | 1300 |
| 110011047 | 2001/01/20 | S | 581 |
| 110011047 | 2001/01/31 | I | 1300 |

F I G. 9

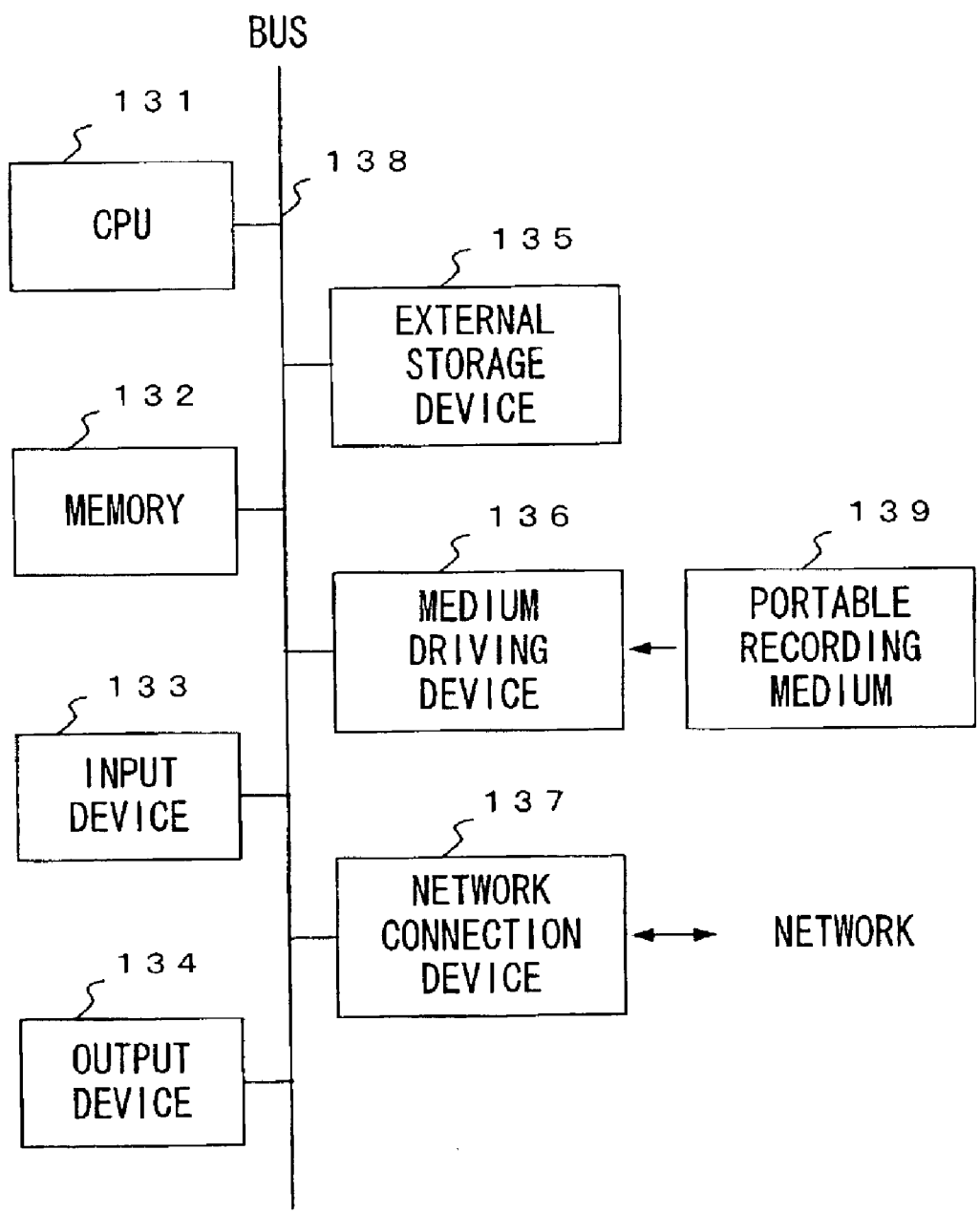
F I G. 10

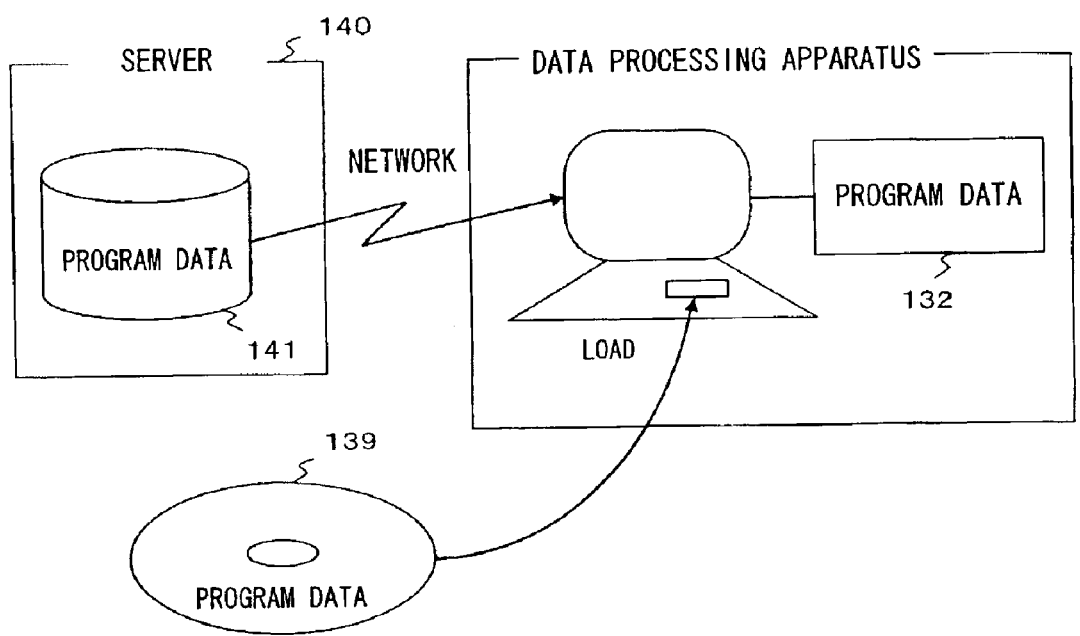
F I G. 11

SEARCH APPARATUS AND METHOD USING ORDER PATTERN INCLUDING REPEATING PATTERN

BACKGROUND OF THE INVENTION

1. Field of the Invention

The present invention relates to a method and an apparatus for searching for a pattern including a repeating pattern from among a large amount of data on the basis of an order possessed by each datum.

2. Description of the Related Art

A conventional technology for handling a repeating patterns of the ordered data includes a pattern matching process using a regular expression for the appearance order of a character string.

The following is the features and the application field of this pattern matching.

In the field of character string search, pattern matching using a regular expression has been used and attention is paid to the appearance order of a character string. First of all, the difference between character string search and pattern matching is clarified. In character string search, a pattern to be searched for is completely defined as "search for a pattern 'abc' from a sentence". However, pattern matching is an operation of searching for an indefinite pattern, and it is also called a pattern collation. In pattern matching, a regular expression is used to designate a pattern.

FIG. 1A shows an example of the pattern matching of character string data and a regular expression 'a(a|b)*a'. Here, '(a|b)*' means that 'a' or 'b' repeatedly appears 0 or more times. Character String Search and Pattern Matching seem to the same process at first glance, but they belong to different categories. Therefore, a different algorithm must be applied to each of them.

For the realization of pattern matching using a regular expression, a finite automaton is used. A two-step approach is taken for the conversion of a regular expression into an automaton. Firstly, a regular expression is converted into an NFA (Non-deterministic Finite Automaton). This conversion into an NFA from a regular expression is easy. Pattern matching can be performed only by an NFA. In many cases, however, the obtained NFA is converted into an equivalent DFA (Deterministic Finite Automaton), and then pattern matching is performed using this DFA.

In a DFA, if input is decided in a specific state, only one transition destination is determined, as the term "deterministic" indicates. In an NFA, on the contrary, if input is decided in a specific state, a plurality of transition destinations might exist as the term "non-deterministic" indicates.

FIG. 1B shows an NFA corresponding to a regular expression 'a(a|b)*a'. Assume the case where a character string 'aaa' is given to this NFA, and then if the first character 'a' is input, NFA makes a transition from a starting state 0 to a state 1. The second character is also 'a', but there are two types of states: state 1 and state 2 as the transition destination of this character 'a'. In conclusion, it is correct for the second character 'a' to transit from state 1 to state 1 and for the third character 'a' to transit from state 1 to state 2. When the second character 'a' is read in, however, it is not determined which state to transit to.

In order to solve this problem, a process in which NFA makes a transition to either state, and if the process fails, it makes a transition to the other state using a back track, is needed. When a back track is used, however, an extra time for turning back to the first state is required.

Thereupon, a pattern matching process is performed not by directly using an NFA that is obtained by converting a regular expression, but by furthermore converting the NFA into a DFA. In the case of a DFA, only one transition destination is always determined differently from an NFA if a state and input are decided. Therefore, the use of a DFA does not require a back track compared to an NFA, thereby enabling a process to be performed at high speed.

For example, the NFA of FIG. 1B is converted into a DFA as shown in FIG. 1C. Here, only one transition destination is determined for the character 'a', and there is no such ambiguity that is seen in the NFA. Therefore, a back track is no more required. Needless to say, it takes time to convert an NFA into a DFA beforehand. In the case where pattern matching is performed for a large amount of data, the speed of this process is sufficiently improved as a whole with the high-speed performance of the DFA that does not require a back track.

A regular expression is recursively defined by three basic operations (operators), such as connection (concatenation), selection (union), and repetition (closure) as shown in FIG. 1D. There are operational priorities among these operations much like a general numeric equation. The strongest coupling is the repetition '*', the second-strongest is the connection, and the last is the selection '|'. However, the priority can be also changed by enclosing characters or symbols within parentheses.

However, there are the following problems in the above-mentioned conventional search process.

Regular expression used in a character string and pattern matching using this expression are general frameworks for providing a search method for the character string in any class. Regular expression and pattern matching using this expression cannot be applied to ordered data as outlined by the following conditions (1) to (3), since the characteristic of the data differs from that of character string data.

(1) In a character string, all the characters are adjacent to each other at regular intervals. In the case of the ordered data, however, there is a case that a plurality of events may exist in a specific position. For example, this is the case for a client who shops for several items on the same day. In this case, an expression "a client 10001 purchases two commodities such as milk and bread on March 21" is required. A regular expression, however, cannot express such events that simultaneously occur since two characters cannot appear in the same position in a character string.

(2) In a character string, a value and a symbol (literal) are equal. Namely, when 'A' is given as a character string, 'A' indicates both a value and a symbol. In the data consisting of a plurality of attributes, however, the combination of the conditions of a plurality of fields must be handled as one symbol. For example, a client who purchases commodities such as a PC and a TV is called a "client group A". A regular expression, however, cannot express the combination of the conditions of such a plurality of fields.

(3) In the case of ordered data, the concept of an interval becomes necessary for orders of data as "the total number of days between the purchase of a PC and that of a TV is within three months". In the regular expression of a character string, however, an interval cannot be designated.

A technology for handling the ordered data is described in an earlier-filed Japan Patent Application No. 2001-340817 (U.S. patent application Ser. No. 10/092,444) "Searching Apparatus and Searching Method Using Pattern of which Sequence is Considered". In this application, the data to be processed consists of a set of records with a plurality of fields (attributes). It is assumed that each record has a predetermined number of fields but it is not assumed that only a specific record has a different number of fields. Furthermore, it is assumed that one or more fields with an order are included in the data.

A field with an order means a field having, in advance, an order relation, such as a date and time, or a field in which an order is generated by rearranging data like a client ID (client identifier) field. Since the combination of a date field and a time field can be regarded as one order field, in some cases, an order of a record may be represented by combining a plurality of fields.

When a pattern with an order is searched for from the target data, the pattern is designated by an event definition and an inter-event definition.

An event definition is created by uniquely naming a condition designated for one or more fields. In the case where a condition is designated for one field, it can be defined, for example, that "a client who purchased a PC as a commodity is called 'a client group A'". Furthermore, in the case of designating a condition for a plurality of fields, the combination of conditions of a plurality of fields is handled as one symbolic label (literal), for example, as "a client who purchased a PC and a camera as commodities is called 'a client group A'".

Specifically, an event can be defined as the label of a record that satisfies the conditions for one or more fields. Furthermore, an event can designate a condition that matches any pattern like a wildcard in a regular expression.

FIG. 1E shows an example of an event definition defined as "a client who purchased a PC and a camera as commodity is called 'a client group A'". As already described, the combination of conditions of a plurality of fields cannot be expressed by a regular expression of a character string.

In addition to an event definition, an inter-event definition describes a relation between one event and another event utilizing an event definition. In the case of the inter-event definition, the condition where there are a plurality of events with the same order or the condition where the interval between orders is not constant (the condition where orders are described at an arbitrary interval) is also conceivable.

If it is assumed that a client who purchased a PC and a camera as commodities is called a client group 'A' and a client who purchased a TV and a VTR as commodities is called a client group 'B', an inter-event definition such as "the interval between 'A' and 'B' is within three visits to the shop" is conceivable. Also, a definition, such as "an interval between 'A' and 'B' is within three days (the difference between the date field of 'A' and that of 'B' is within three days) is also conceivable.

Furthermore, the restriction covering an event and another event can be also described for fields with no order. For example, a definition, such as "the price of 'A' is higher than that of 'B'" is conceivable. Furthermore, it is possible to designate a condition by an inter-event definition even in the case where an event definition is designated by a wildcard that matches any pattern.

FIG. 1F shows an example of an inter-event definition. In this example, the interval between event 'A' and event 'B' is within three days, and an interval between event 'A' and an event 'C' is within five days.

In a regular expression, an expression of a .. b using '.' that matches all the characters means that 'b' appears after a sequence of three characters beginning with a literal 'a', which differs from the event definition that a condition is designated for one or more fields.

Furthermore, the fact that the relation between arbitrary events can be defined means that a matching pattern to be searched for can be expressed by a graph structure. In the example of FIG. 1F, an inter-event restriction exists between an event definition 1 and an event definition 2, while the inter-event restriction exists between an event definition 1 and an event definition 3.

By designating a pattern using an event definition and an inter-event definition, a pattern designation search for an ordered record group can be realized. If a pattern includes a repetition designation, however, in some cases, a back track is required in the search process. The following is the explanation of this problem using the multidimensional data (data of a plurality of fields) shown in FIG. 1G, as an example.

Of the data shown in FIG. 1G, RID is a record identifier, and each record possesses three fields, namely, purchase date, commodity, and price. An order is defined by a purchase date. A continuous purchase date does not mean a consecutive calendar date, but rather it is assumed to be a date when a client comes to the store next. A search pattern query (event pattern) is given as follows:

Event Definition
Event1: commodity=B
Event2: commodity=C
Order
(Event1+)–Event2
Inter-Event Definition
Event2.purchase date<=Event1.purchase date+2 days In this event pattern, the order indicates that Event2 occurs subsequently after Event1 continuously occurs one or more times. The inter-event definition indicates that the interval between the purchase date of Event1 and that of Event2 is within two days. In a search process of the above-mentioned prior application, an inquiry pattern as shown in FIG. 1H, is generated from this event pattern, and the process proceeds using two pointers, such as a pointer DP to the data and a pointer PP to the inquiry pattern.

Regarding PP, FIG. 1H shows that Event1 (commodity= B) repeats one or more times if PP=1, while Event2 (commodity=C) is pointed to by the pointer if PP=2. In this case, since the order of appearance of Event2 is after that of Event1, the inter-event definition is added in the location of PP=2.

Initial state of DP=2001/01/13 and PP=1 is set by an initialization process, and firstly, it is checked to see whether or not any datum from the data of DP=2001/01/13 matches the pattern of commodity=B that is described by the event definition at PP=1. In this case, since the record of R1 matches the pattern, the pointer DP is incremented and DP becomes 2001/01/15. Regarding PP, two cases exist: a case where Event1 is continuously repeated and a case where a record matches commodity=C of Event2. In the case where there is a branch into two or more cases like this, a back track for checking for an alternative branch destination becomes required if a selected branch is executed and found not to be correct.

For example, in order to check whether or not PP=1 is continuously repeated, it is checked whether or not the pattern of the event definition of PP=1 matches the data of DP=2001/01/15. In this case, since the record R5 matches the condition of PP=1, DP becomes 2001/01/16. Regarding PP, there is a branch into two cases where the repetition of Event1 should be checked and Event2 should be checked.

Thereupon, the record R8 matches the data of DP=2001/01/16 when the repetition of Event1 is checked. In other words, three matchings of commodity B as defined in Event1, such as Event1-Event1-Event1 can be obtained. If DP=2001/01/20, however, since there is no matching data in Event1 nor Event2, the matching fails. Therefore, the process should be performed again from the branch.

In the majority of cases, many commodities are purchased at the same time generally which is reflected in ordered multidimensional data such as the receipt of POS (Point-Of-Sales). When a back track occurs in the search process for such multidimensional data, the efficiency of the process deteriorates remarkably. Therefore, a method of searching ordered data without the need for a back track, is desirable.

SUMMARY OF THE INVENTION

The present invention aims at providing an apparatus and a method for efficiently searching for a pattern, that includes a repetition of an event, from amongst the ordered data.

The search apparatus of the present invention is provided with an input device, a conversion device, a search device, and an output device, and it searches for a combination of records from a set of records with a plurality of attributes.

The input device inputs a search pattern query that is designated using a plurality of events each of which defines a predetermined attribute of a record with a predetermined value, and an order relation among the plurality of events, which is defined based on the order of an attribute value. The conversion device extracts the order relation from the search pattern query, and converts the extracted order relation into a deterministic finite automaton.

The search device repeats a process of reading one or more records positioned in the same order from the set of records, of checking whether or not a state transition can be performed on the deterministic finite automaton using the thus-read records, and of registering, in a state transition set, both the transition destination of a possible state transition and additional information that indicates a record enabling the possible state transition. When an end state of the deterministic finite automaton is registered in the state transition set as a transition destination, the search device obtains a combination of records corresponding to the search pattern query from additional information of the state transition which has reached the end state. Subsequently, the output device outputs the obtained combination of records as a search result.

BRIEF DESCRIPTION OF THE DRAWINGS

FIG. 1A shows pattern matching using a regular expression;

FIG. 1G shows the first data to be searched;

FIG. 1H shows an inquiry pattern;

FIG. 3 is a flowchart showing the whole process of the present invention;

FIG. 8 shows the first data to be searched;

FIG. 9 shows rearranged data;

FIG. 10 shows the configuration of a data processing apparatus; and

FIG. 11 shows recording media.

DESCRIPTION OF THE PREFERRED EMBODIMENT

The following is the detailed explanation of the preferred embodiment of the present invention in reference to the drawings.

Figure 2A:
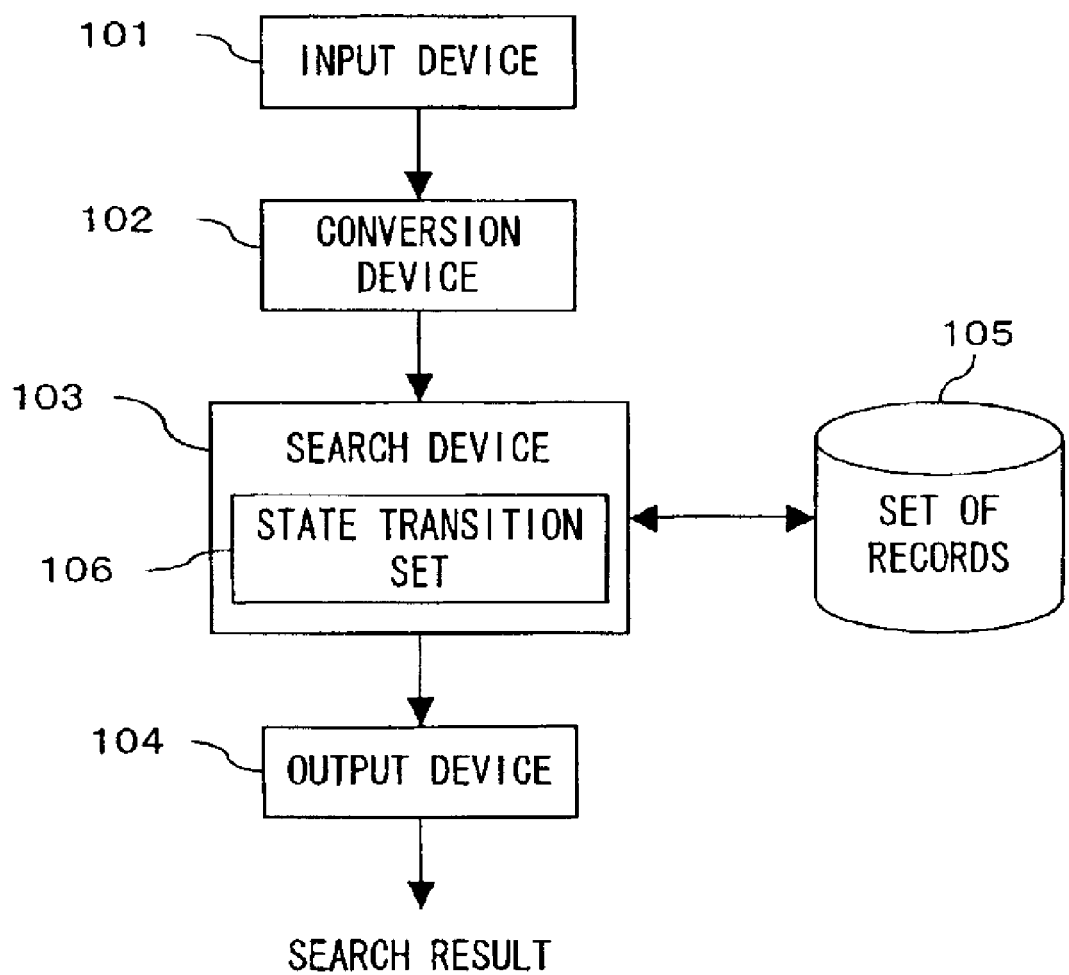
FIG. 2A shows the principle of a search apparatus of the present invention.

FIG. 2A is a block diagram showing the principle of a search apparatus of the present invention. The search apparatus shown in FIG. 2A is provided with an input device 101, a conversion device 102, a search device 103, and an output device 104. The apparatus searches for a combination of records from a set of records 105 that consist of a plurality of attributes.

The input device 101 inputs a search pattern query that includes a repetition of events and that is designated using a plurality of events each of which defines that a predetermined attribute of a record has a predetermined value, and also using an order relation amongst the plurality of events, which is defined based on the order of the attribute value. The conversion device 102 extracts the order relation from the search pattern query, and converts the thus-extracted order relation into a deterministic finite automaton.

The search device 103 repeats the process of reading one or more records positioned in the same order from the set of records 105, checks whether or not a state transition can be performed with the deterministic finite automaton using the read records, and registers into a state transition set 106 both the transition destination of a possible state transition and additional information indicating a record enabling the possible state transition. When an end state of the deterministic finite automaton is registered into the state transition set 106 as a transition destination, the search device 103 obtains a combination of records corresponding to the search pattern query from additional information of the state transition which has reached the end state. Subsequently, the output device 104 outputs the obtained combination of records as a search result.

A user can designate a search pattern query such as one that includes a repetition of a specific event using the input device 101, as a query that is decided by a plurality of events and an inter-event order relation. The inputted search pattern query is passed to the conversion device 102, and then the conversion device 102 converts the information about the order relation into a deterministic finite automaton.

The search device 103 reads one or more records which are in the same order as a group, while setting the set of records 105 as the data to be searched, and checks whether or not each record corresponds to an event for enabling a state transition defined by the deterministic finite automaton. If a specific record corresponds to such an event, the state of a transition destination of the record and additional information (identification information of a record, etc.) are registered in the state transition set 106.

As a default value of the state transition set 106, the starting state of the deterministic finite automaton is registered. After newly registering states of transition destinations to the state transition set 106, it has a plurality of states.

The search device 103 repeats a process of reading records, determining whether or not a state transition from a state registered in the state transition set 106 to the next state can be performed, and updating the state transition set 106. When the end state of the deterministic finite automaton is registered as a transition destination, the search device 103 identifies the combination of records, which has caused the state transition, from the additional information about state transitions beginning from the starting state to the end state. Then, the output device 104 outputs the obtained combination of records as a search result corresponding to the search pattern query.

When the possibility of a state transition by the deterministic finite automaton is checked, all the possible transition destinations which can be reached by a plurality of records can be registered by managing transition destinations as the state transition set 106. Therefore, even in the case where there is a branch due to the repetition of an event, the search process can efficiently proceed while simultaneously registering the possible transition destinations of the branch. Consequently, a back track can be prevented.

In the case where there is a restriction between events, other than the order relation, which is included in a search pattern query, the conversion device 102 extracts the restriction from the search pattern query, and passes the restriction to the search device 103. Then, the search device 103 checks whether or not the record that enables a state transition meets the restriction. In this way, a combination of records that meet both the order relation and the restriction can be obtained.

The input device 101 of FIG. 2A corresponds to, for example, an input device 133 of FIG. 10, which is described later, while the conversion device 102 of FIG. 2A corresponds to, for example, a pattern conversion unit 114 of FIG. 2B, which is also described later. Furthermore, the search device 103 and the output device 104 of FIG. 2A correspond to, for example, a search process unit 115 of FIG. 2B.

Figure 2B:
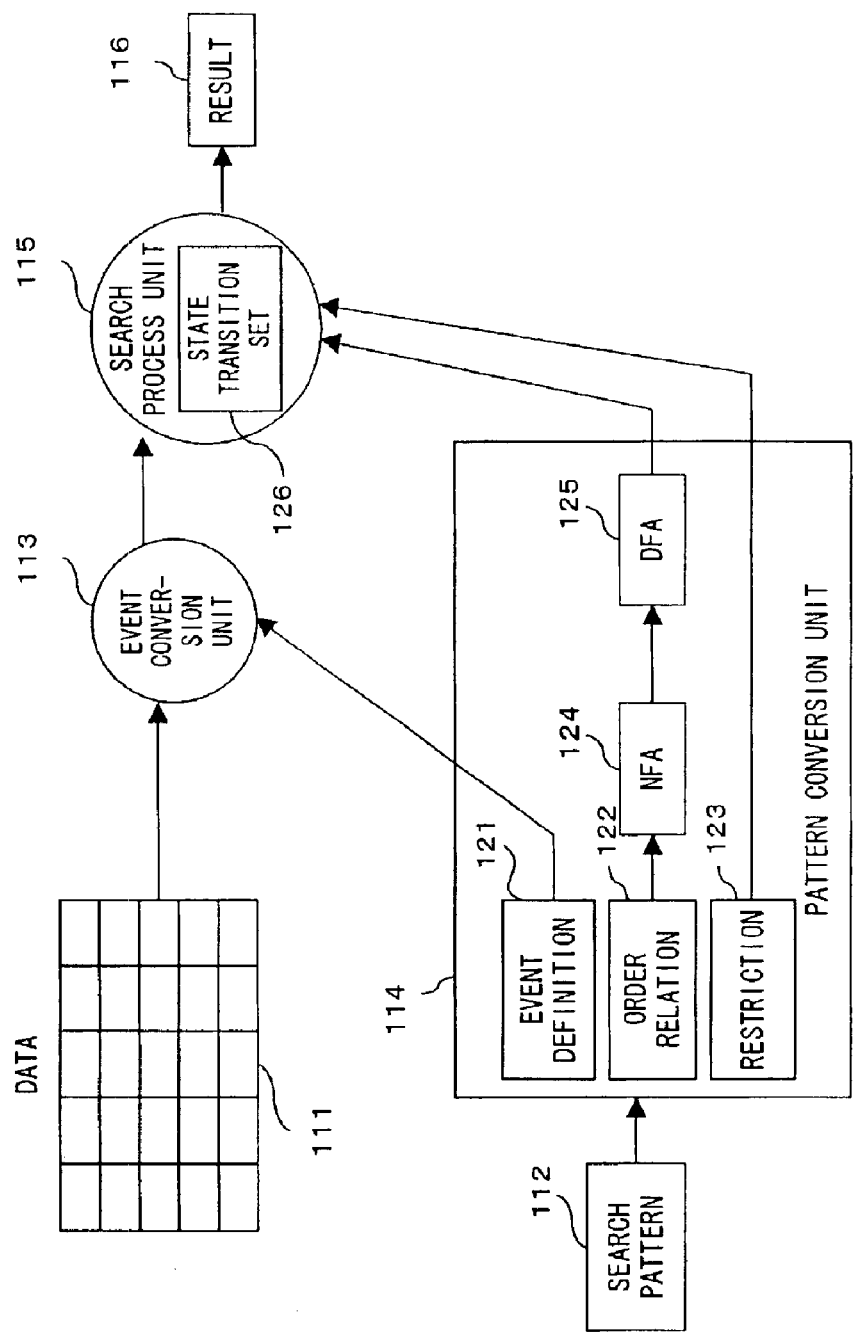
FIG. 2B shows the configuration of the search apparatus.

FIG. 2B is a block diagram showing the configuration of a search apparatus of the present embodiment. The search apparatus of FIG. 2B is provided with an event conversion unit 113, a pattern conversion unit 114, and a search process unit 115. The search apparatus searches ordered multidimensional data 111 for a combination of data that matches a search pattern query 112 including a repetition.

The event conversion unit 113 is provided to recognize to which event each record of the thus-given data 111 corresponds, and converts each recognized record into an event symbol.

The pattern conversion unit 114 breaks down the thus-given search pattern query 112 into an event definition 121, an order relation 122, and an inter-event restriction 123, which is different from the order relation. Then, it outputs the event definition 121 to the event conversion unit 113, while outputting the restriction 123 to the search process unit 115.

The event conversion unit 113 converts the event definition 121 into an event symbol. In this case, a symbol that matches any pattern like '.' used in a regular expression can be also used as an event symbol. As for the restriction 123, a condition for the interval between events, a condition that values of a specific field between events are identical or different, or the like can be arranged.

Moreover, after the pattern conversion unit 114 converts the order relation 122 into a non-deterministic finite automaton (NFA) 124, it furthermore converts the automaton into a deterministic finite automaton (DFA) 125 and outputs it to the search process unit 115. These conversions are made to prevent aback track by advancing the search process using a deterministic finite automaton with states.

The search process unit 115 reads the data converted by the event conversion unit 113, checks whether or not the data matches the event definition 121 using the DFA 125, and outputs a search result 116. Here, since the ordered multidimensional data 111 is not a search target that is assumed by a conventional deterministic finite automaton, the deterministic finite automaton in this embodiment is modified as follows:

(1) In some cases, the value of specific data matches a plurality of events or a plurality of records located at the same order position. Therefore, a plurality of transition destinations of state transitions exist and these destinations are grouped into a state transition set. Furthermore, in order to perform not only the state transition but also the check of the relation between events, information about the matched records is added to the state transition set as history information of the state transition.

(2) In addition to the check of whether or not a state transition by the given record can be performed, it is also checked whether or not the record meets the inter-event restriction 123.

(3) In order to complete state transitions by scanning data once, when whether or not a transition can be performed is checked, the starting state is added to the state transition set every time and the transitions from the starting state are also checked.

FIG. 3 is a flowchart showing the whole process of the search apparatus shown in FIG. 2B. Firstly, a user inputs the data 111 (step S1) and designates the search pattern query 112 (step S2).

The pattern conversion unit 114 analyzes the designated search pattern query 112 and extracts an event definition part while the event conversion unit 113 converts the extracted event definition 121 and the data 111 into event symbols (step S3). Furthermore, the pattern conversion unit 114 converts the part of the search pattern query 112 that indicates the order relation into the DFA 125 (step S4) and extracts the relation between events, which is different from the order relation, as the restriction 123 (step S5).

After the search process unit 115 reads data, it checks whether or not the data matches the event definition 121 (step S6). At this time, the mechanism of a conventional state transition is modified to a state transition set with additional information, in order to apply a state transition to the ordered data. In the case where the data matches the event definition 121, the unit 115 performs a state transition by the DFA 125 and checks whether or not the data satisfies the order relation 122. If it is satisfied, the unit furthermore checks whether or not the data satisfies the restriction 123.

In this way, by repeating a process of reading data, performing a transition, and determining the restriction 123 in step S6, the search process unit 115 searches for a combination of data that matches the designated search pattern query 112, and outputs the search result 116 (step S7).

Here, an algorithm for converting the order relation 122 included in the search pattern query 112 into the DFA 125 is described. This conversion can be easily realized, for example, using the conversion theory that is introduced in the following Reference 1.

Reference 1: A. V. Aho and J. D. Ullman, translated by Norihisa Doi, "Compiler", published by Baifukan, pp. 84–91, 1986.

The following pattern is used as a search pattern query, where Event1 and Event2 are represented by 'a' and 'b', respectively, for convenience sake.

Event Definition
Event1: commodity=B
Event2: commodity=C
Order
(Event1+)–Event2
Inter-Event Definition
Event2.purchase date<=Event1.purchase date+2 days In this case, the order relation between Event1 and Event2 is replaced by a regular expression 'a+b'. From this regular expression, an NFA can be mechanically configured using the algorithm 3.2 described on page 87 of Reference 1. Hereinafter, a symbol '$\epsilon$' shall mean an '$\epsilon$ transition' that is performed in any event.

Firstly, 'a+' becomes equivalent to 'aa*' since 'a' is repeated one or more times. Here, 'a*' means that 'a' is repeated 0 or more times. Thereupon, 'a+b' can be equivalently converted into 'aa*b'. Next, an NFA can be generated by decomposing 'aa*b', defining a state transition for each of 'a', 'a*' and 'b', and combining all of them.

Firstly, a state transition can be defined for each of 'a' and 'b' as follows:
state0→a→state3
state2→b→state1

Here, state0 and state1 indicate a starting state and an end state, respectively.

Figure 4:
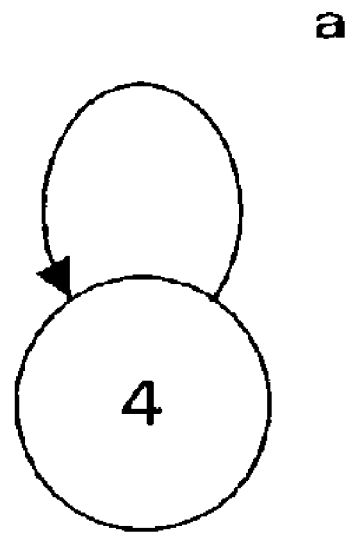
FIG. 4 shows the first state transition.
Figure 5:
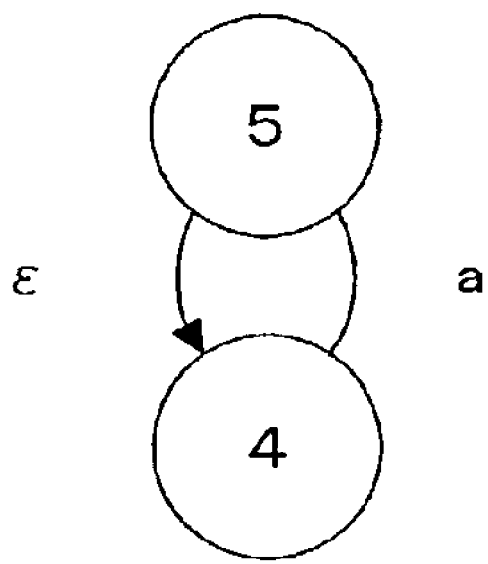
FIG. 5 shows the second state transition.
Figure 6:
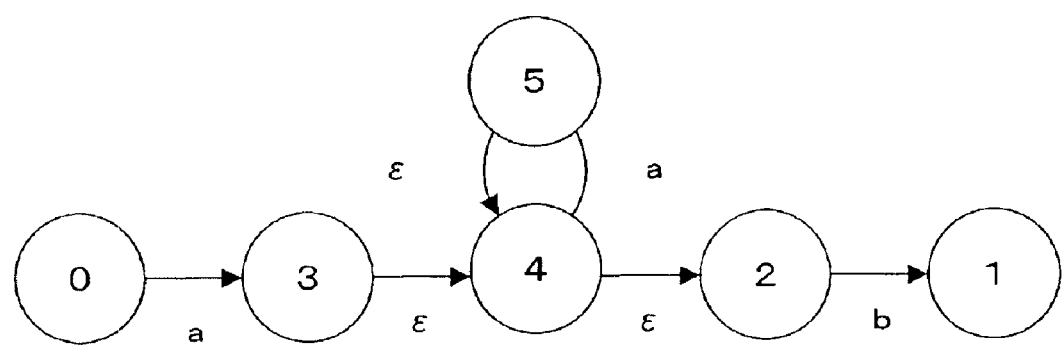
FIG. 6 shows the second NFA.

Regarding 'a*', a state transition as shown in FIG. 4 can be defined. In FIG. 4, a transition from state4 to state4 by 'a' is shown. This state transition is equivalent to a transition from state4 to a new state (state5) by 'a' and a subsequent transition from state5 to state4 using an $\epsilon$ transition, as shown in FIG. 5. Thereupon, the state transition of 'a*' is determined as shown in FIG. 5, and an NFA as shown in FIG. 6 can be obtained by combining the state transition with state transitions of 'a' and 'b' using the $\epsilon$ transitions. The following is a state transition represented by the obtained NFA.
====NFA====
state0: (a.3)
state1: (end)
state2: (b.1)
state3: ($\epsilon$.4)
state4: ($\epsilon$.2)(a.5)
state5: ($\epsilon$.4)

It is clear in this NFA that a transition can be performed by 'a' from state4 to both state2 and state5, and the transition destination cannot be uniquely decided.

Next, the conversion from an NFA to a DFA can be mechanically performed by the algorithm 3.1 described on page 84 of Reference 1. Using this algorithm, the above-mentioned NFA is converted into the following DFA.
====DFA====
dfa0: a→1
dfa1: b→3 a→2
dfa2: b→3 a→2
dfa3: (end)

The correspondence relation between a DFA state (dfa0 through dfa3) and an NFA state (state0 through state5) is as follows:
dfa0=NFA{state0}
dfa1=NFA{state2, state3, state4}
dfa2=NFA{state2, state4, state5}
dfa3=NFA{state1} dfa0 is a starting state, and this consists of state0. A transition from dfa0 to dfa1 is performed by 'a', and dfa1 consists of state2, state3 and state4. A transition from dfa1 to dfa3 is performed by 'b', and a transition from dfa1 to dfa2 is performed by 'a'. Therefore, it is understood that a transition is uniquely performed by 'a' and 'b' from each state, in the DFA.

Figure 7:
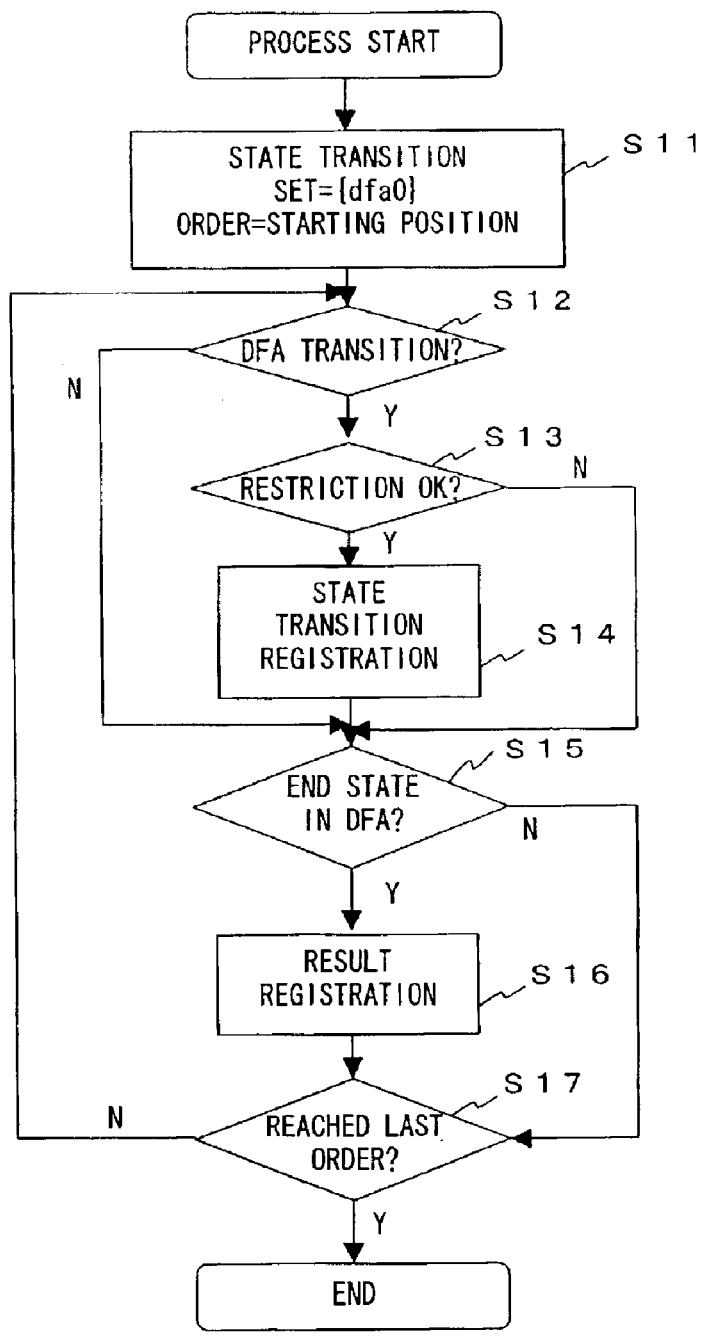
FIG. 7 is a flowchart showing a search process of the present invention.

FIG. 7 is a flowchart showing the search process performed in step S6 of FIG. 3. The search process unit 115 first performs an initialization process, sets the state transition set to {dfa0} which is the starting state, and determines a record (or a record group) positioned in the leading order (starting position) as the record to be processed (step S11).

Figure 1B:
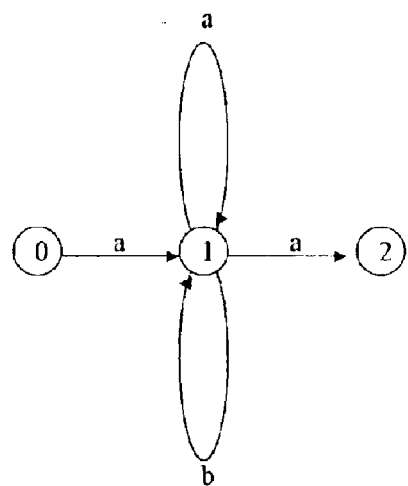
FIG. 1B shows the first NFA.
Figure 1C:
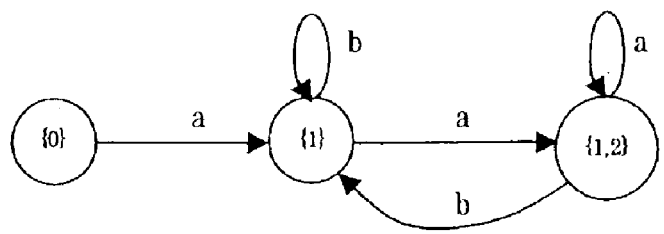
FIG. 1C shows a DFA.
Figures 1D, 1E, 1F:
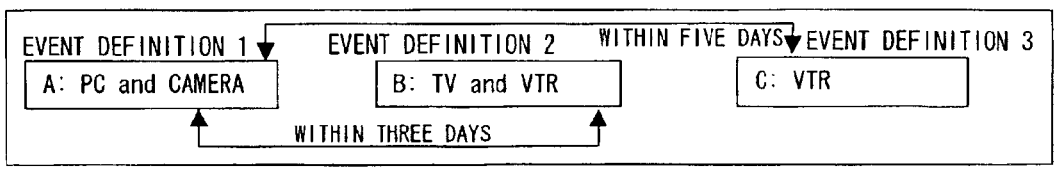
FIG. 1D shows the operators of a regular expression.
FIG. 1E shows an event definition.
FIG. 1F shows an inter-event definition.

Then, the unit 115 reads a record to be processed, and checks whether or not a transition from the state registered in the state transition set can be performed using the thus-read record (step S12). At this time, a plurality of records in the same order position are handled as a group. For example, if there are three records dated 2001/01/15 as shown in FIG. 1G, it is checked for these records whether or not a transition from the state transition set can be performed on the DFA 125.

If a transition can be performed by a specific record, it is checked whether or not the record satisfies the condition of the restriction 123 (step S13), and a new transition destination is added to the state transition set if the condition is satisfied (step S14). Furthermore, a state registered in the state transition set, which does not indicate a possible transition is eliminated from the state transition set. However, dfa0 remains, without being eliminated, and the transitions from the starting state are checked each time a transition is performed. Thus, all the transition processes can be simultaneously performed by scanning the data to be searched just once.

Then, it is determined whether or not a state transition using the DFA 125 reaches the end state (step S15). If it does not reach the end state, it is checked whether or not the end of data (last order) has been processed (step S17). If the state transition reaches the end state, the result is registered (step S16), and the determination of step S17 is performed.

If the end of data has not been processed, the processes in and after step S12 are repeated setting a record in the next order as a process target. If the end of data has been processed in step S17, the process terminates.

Such a search process enables a regular-expression-type search to be efficiently performed with an order pattern that is designated by event definitions and inter-event definitions.

In the meantime, it is assumed that a specific event continuously occurs as outlined by the repetitions of the above-mentioned search pattern query. However, even if an event does not continuously occur, it is preferable to designate a search pattern query including a repeating event. This search pattern query can be designated using a similar expression to the one used in the case where an event continuously appears. Therefore, the search process of this embodiment can be also applied to search pattern queries for the events that do not continuously occur.

A fact that Event1 repeatedly appears even if Event1 does not continue is expressed as, for example, '(Event1.*)+'. In this case, since '.' after Event1 matches any event, this expression can cover both the case that Event1 continues and the case where Event1 does not continue, if '.' appears 0 or more times.

By handling '.' as a symbol corresponding to "ANY" in an automaton, an NFA and a DFA can be generated using the above-mentioned algorithm, based on the order relation including '.'. In this case, the event conversion unit 113 converts '.' into an event symbol corresponding to ANY, while the search process unit 115 handles ANY as a symbol that can match any kind of record.

Next, a search process is outlined in the case where the above-mentioned search pattern query is designated for the search of the data shown in FIG. 1G.

Firstly, the search apparatus registers the designated search pattern query to distinguish the fact that Event1 shows commodity=B, while Event2 shows commodity=C. In this way, it can be determined which event (or event group) the-thus read record matches. If the ordered multi-dimensional data is to be searched, a domain of data (twenty six characters if it is expressed by the alphabet) cannot be generally recognized in advance, which is different in the case of pattern matching of a character string.

Next, the search apparatus generates a DFA that shows the order relation of the search pattern query in accordance with the above-mentioned procedure, sets the starting position to 2001/01/13 and the initial state transition set to {dfa0}, and starts the search process. In this case, the inter-event restriction is Event2.purchase date<=Event1.purchase date+2 days, and accordingly there is no need to check the restriction as long as the search reaches dfa3 of the end state.

Firstly, three records R1, R2 and R3 become a process target. It is understood that R1 matches Event1, and R2 matches Event2. It is also understood that a transition from {dfa0} to {dfa1} on the DFA can be performed by 'a', that is, Event1. Thereupon, a transition destination dfa1 in the transition of dfa0 →a→dfa1, and a record identifier (RID) and an event identifier which function as history information (additional information), are registered in the state transition set. Thus, the state transition set becomes as follows:
dfa0
dfa1: record R1 event a In this example, a record and an event are registered as history information, but if the corresponding record and event can be uniquely identified, the other information can be also registered. It has been decided that if a transition is detected, the restriction is checked. However, since in the case of only 'a', it is not necessary to check the restriction between events, this process is skipped.

Subsequently, the order advances to 2001/01/15. In this way, the three records R4, R5 and R6 become a process target. Here, R5 matches Event1 and R6 matches Event2. When a transition from the state transition set {dfa0, dfa1} is checked, a transition of dfa0→a→dfa1 can be performed by R5 regarding dfa0. Regarding dfa1, a transition of dfa1→a→dfa2 can be performed by R5 and that of dfa1→b→dfa3 can be also performed by R6.

Thereupon, history information is added to these transition destinations, such as dfa1, dfa2 and dfa3 to be temporarily registered in the state transition set. At this time, a state having no new transition destination (a state that is included in the original set) is removed from the state transition set, but dfa0 is kept stored without fail. In this way, the state transition set becomes as follows:
dfa0
dfa1: record R5 event a
dfa2: record R1 event a record R5 event a
dfa3: record R1 event a record R6 event b Here, regarding event 'a' and 'b' that have reached dfa3 in which the restriction can be estimated, it is checked whether or not the restriction is satisfied. In this case, the purchase date of R1 is 2001/01/13, while the purchase date of R6 is 2001/01/16. Therefore, there is an interval of three days between the purchase date of R1 and that of R6, and the above-mentioned restriction is not satisfied. Accordingly, dfa3 is removed from the state transition set. In this way, the state transition set becomes as follows:
dfa0
dfa1: record R5 event a
dfa2: record R1 event a record R5 event a Then, the order advances to 2001/01/16. Thus, the three records R7, R8, and R9 become a process target. R8 matches Event1, while R9 matches Event2. At this time, the following sate transitions can be performed by R8 and R9 from the state transition set of {dfa0, dfa1, dfa2}.
dfa0→a→dfa1 (R8)
dfa1→a→dfa2 (R8)
dfa1→b→dfa3 (R9)
dfa2→b→dfa3 (R9)

Then, history information is added to these transition destinations to be temporarily registered in a state transition set. At this time, a state that is other than dfa0 and is included in the original set is removed from the state transition set. In this way, the state transition set becomes as follows:
dfa0
dfa1: record R8 event a
dfa2: record R5 event a record R8 event a
dfa3: record R5 event a record R9 event b (1)
dfa3: record R1 event a record R5 event a (2) record R9 event b Here, regarding transitions (1) and (2) which reach dfa3 in which the restriction can be evaluated, it is checked whether or not the restriction is satisfied. Regarding (1), since the purchase date of R5 is 2001/01/15 and the purchase date of R9 is 2001/01/16, the restriction is satisfied. Therefore, (1) is registered as a search result and is removed from the state transition set.

Regarding (2), since the purchase date of R1 is 2001/01/13, and the purchase date of R9 is 2001/01/16, there is an interval of three days between these purchase dates. Therefore, the restriction is not satisfied. Accordingly, (2) is removed from the state transition set. In this way, the state transition set becomes as follows:
dfa0
dfa1: record R8 event a
dfa2: record R5 event a record R8 event a Lastly, the order advances to 2001/01/20. In this way, the three records R10, R11 and R12 become a process target but there is no record matching the event definition. Therefore, a transition cannot be performed from the state transition set of {dfa0, dfa1, dfa2}, and as a result, dfa1 and dfa2 are removed from the transition set state.

Here, since a search of all the data has been completed, the processes terminate. In this way, the following order pattern is output as the search result.
record R5 event a record R9 event b Next, an additional function of the search apparatus of the present embodiment is described. Generally, the search process unit 115 outputs the result after it searches up to the end of data. In the case of a large amount of data, however, the delivery of the result is delayed. Because of this, each time a pattern that matches the search pattern is detected, the search apparatus outputs a record group composed of the pattern. In this way, the delivery response of the result output can be shortened in the case of a large amount of data.

Various types of methods are conceivable for a method of designating pattern matching in a search process. In pattern matching in a regular expression, the basic type of match is the "longest match" that returns the longest character string matching a given character string pattern. In the Perl (Practical Extraction and Report Language) process system, however, the "shortest match" for returning the shortest character string that matches the given character pattern can be designated.

In pattern matching based on an order that is described in this embodiment, the following matching designation including the matching used in a regular expression, can be performed. In the case where a plurality of pattern matchings are simultaneously designated, the search process unit 115 lists corresponding patterns to be output.

(1) Longest match: A pattern with the longest interval between events is returned from amongst patterns that match the given search pattern.

(2) Shortest match: A pattern with the shortest interval between events is returned from amongst patterns that match the given search pattern.

(3) First match: A first pattern that matches the given search pattern is returned.

(4) All match: All patterns that match the given search pattern are returned.

(5) Longest match from the end of data in the reverse direction: A pattern with the longest interval between events is returned from amongst patterns that match the given search pattern in the reverse direction.

(6) Shortest match from the end of data in reverse direction: A pattern with the shortest interval between events is returned from amongst patterns that match the given search pattern in the reverse direction.

Furthermore, a user can also designate the output format of a search result outputted by the search process unit 115. In this case, the search process unit 115 compiles and outputs the information of a record group that is included in the searched pattern, in a designated format.

For example, as for the search pattern indicating that a TV is purchased within three days after a PC is purchased, a user can designate a calculation using a specific field like "client ID, purchase date of a PC, purchase date of a TV, interval between purchase date of a PC and that of a TV (purchase date of a TV—purchase date of a PC)". The search process unit 115 detects a corresponding pattern from amongst the given data, and extracts and outputs the purchase date of a PC and that of a TV from the pattern. At the same time, the unit 115 calculates and outputs an interval between the purchase date of a PC and that of a TV.

Furthermore, the search process unit 115 can perform an aggregating function of a record group for a detected pattern including the repetition, and output the function result as well. As the aggregating function, general functions, such as a minimum value (MIN), a maximum value (MAX), an average value (AVG), and the sum of values (SUM) are used. When these aggregating functions are performed, every time one pattern is detected, the pattern is stored in a buffer. When the search of a specific number of matching patterns terminates, an aggregating function is performed for all the stored patterns.

For example, a user can designate a search pattern query, such as "client ID, purchase date of a PC, purchase date of a TV, AVG(price of PC and TV)" for the search pattern query indicating that a TV is purchased within three days after a PC is purchased.

In the meantime, if a pattern that matches a search pattern query is not detected, this fact must be reported to a user in some way. For example, a record indicating that there is no matching pattern is prepared beforehand, and in the case where NULL is output as a search result, a message is displayed on a screen using the record, thereby notifying a user of the result.

Furthermore, when a set of records consisting of a plurality of fields is given as data, the records are grouped (GROUPBY), thereby improving the processing speed. At this time, a user designates by which field records are grouped, and also designates by which field records of each group are sorted, so that records are re-arranged beforehand. As a field used for grouping, a user can designate a plurality of fields.

For example, the data shown in FIG. 8 are used as a search target and grouped by a client ID field, and the records of each group are sorted by a purchase date field. In this case, the data to be searched are grouped and sorted to be re-arranged as shown in FIG. 9. In this case, the client, with a client ID 110001001, came to the shop on 2001/01/13 for the first time, and purchased two commodities 'A' and 'N'. Furthermore, the same client came to the shop on 2001/01/28 for the second time, and purchased another commodity B.

By considering the re-arranged data as the search target, the search process unit 115 can perform-matching only by sequentially extracting the arranged records for each group. Therefore, data can be processed at high speed even in the case where all the data cannot be stored in a memory.

In the above-mentioned search pattern query of the preferred embodiment, only two events of Event1 and Event2 are used to simplify the description. Moreover, only one condition is used for an event definition and an inter-event definition. In reality, however, a search pattern query can be designated by a larger number of events, and also a larger number of conditions can be designated in the event definition and the inter-event definition.

In the meantime, the search apparatus of FIG. 2B is configured by using, for example, a data processing apparatus (computer) as shown in FIG. 10. The data processing apparatus of FIG. 10 comprises a CPU (Central Processing Unit) 131, a memory 132, an input device 133, an output device 134, an external storage device 135, a medium driving device 136, and a network connection device 137. These components are mutually connected by a bus 138.

The memory 132 includes, for example, a ROM (Read Only Memory), a RAM (Random Access Memory), etc., and stores a program and data to be used for the process. The CPU 131 performs the required process by executing the program using the data stored in the memory 132.

In this case, an event conversion unit 113, a pattern conversion unit 114 and the search process unit 115 of FIG. 2B are stored in the memory 132 as a program, while the information about the restriction 123, the DFA 125 and the state transition set 126 of FIG. 2B are stored in the memory 132 as data. The search process unit 115 reads the data to a process target into the memory 132 from the external storage device 135, and repeats a process of updating the state transition set 126 with reference to the-restriction 123 and the DFA 125.

The input device 133 is, for example, a keyboard, a pointing device, a touch panel, etc. to be used for the input of the instructions and information from a user. The output device 134 is, for example, a display, a printer, a speaker, etc. to be used for the output of the inquiry to a user or the output of a search result.

The external storage device 135 is, for example, a magnetic disk device, an optical disk device, a magneto-optical disk device, a tape device, etc. The data processing apparatus stores the above-mentioned program and data in the external storage device 135, and loads them into the memory 132 to be used as the occasion demands.

The medium driving device 136 drives a portable recording medium 139, and accesses the recorded contents. As for the portable recording medium 139, an arbitrary computer-readable recording medium such as a memory card, a flexible disk, a CD-ROM (Compact Disk Read Only Memory), an optical disk, a magneto-optical disk or the like is used. A user stores the above-mentioned program and data in the portable recording medium 139, loads them into the memory 132, and uses them as the occasion demands.

The network connection device 137 is connected to an arbitrary communication network, such as a LAN (Local Area Network), the Internet or the like, and performs a data conversion as required during communications. The data processing apparatus receives the above-mentioned program and data from another apparatus via the network connection device 137, loads them into the memory 132, and uses them as the occasion demands.

FIG. 11 shows computer-readable recording media that can supply a program and data to the data processing apparatus of FIG. 10. The program and data stored in a database 141 of the portable record medium 139 and a server 140 are loaded into the memory 132. At this time, the server 140 generates a propagation signal for propagating the program and data, and transmits them to the data processing apparatus through an arbitrary transmission medium on the network. Then, the CPU 131 executes the program using the data, and performs the required process.

According to the present invention, ordered data can be effectively searched for a pattern including a repetition of events. Since the data can be searched by one-time scanning, the present invention can perform a search process at high speed even in the case where the space of a main memory of a computer is limited. Furthermore, the present invention can be applied to various types of search by changing the definition of a pattern, so that it is of practical.

What is claimed is:

1. A search method of searching for a combination of records from a set of records consisting of a plurality of attributes, comprising
    extracting order relation among a plurality of events, each of which defines that a predetermined attribute of a record has a predetermined value, the order relation defined based on an order of an attribute value, from a search pattern query that includes a repetition of an event and that is designated using the plurality of events and the order relation, and converting the extracted order relation into a deterministic finite automaton;
    repeating a process of reading into a memory one or more records positioned in a same order position from the set of records, of checking whether or not a state transition can be performed by the deterministic finite automaton using the read records, and of registering in a state transition set a transition destination of a possible state transition and additional information indicating a record enabling the possible state transition;
    obtaining a combination of records corresponding to the search pattern query from additional information of a state transition which has reached an end state of the deterministic finite automaton when the end state is registered in the state transition set as a transition destination; and
    outputting the obtained combination of records as a search result.

2. A search apparatus searching for a combination of records from a set of records consisting of a plurality of attributes, comprising:
    an input device inputting a search pattern query that includes a repetition of an event and that is designated using a plurality of events, each of which defines that a predetermined attribute of a record has a predetermined value, and using an order relation among the plurality of events, which is defined based on an order of an attribute value;
    a conversion device extracting the order relation from the search pattern query, and converting the extracted order relation into a deterministic finite automaton;
    a search device repeating a process of, reading one or more records positioned in a same order position from a set of records, of checking whether or not a state transition can be performed by the deterministic finite automaton using the read records, and of registering in a state transition set a transition destination of a possible state transition and additional information indicating a record enabling the possible state transition, and when an end state of the deterministic finite automaton is registered in the state transition set as a transition destination, obtaining a combination of records corresponding to the search pattern query from additional information of a state transition which has reached the end state; and
    an output device outputting the obtained combination of records as a search result.

3. A search apparatus searching for a combination of records from a set of records consisting of a plurality of attributes, comprising:
    input means for inputting a search pattern query that includes a repetition of an event and that is designated using a plurality of events, each of which defines that a predetermined attribute of a record has a predetermined value, and using an order relation among the plurality of events, which is defined based on an order of an attribute value;
    conversion means for extracting the order relation from the search pattern query, and converting the extracted order relation into a deterministic finite automaton;
    search means for repeating a process of, reading one or more records positioned in a same order position from a set of records, of checking whether or not a state transition can be performed by the deterministic finite automaton using the read records, and of registering in a state transition set a transition destination of a possible state transition and additional information indicating a record enabling the possible state transition, and when an end state of the deterministic finite automaton is registered in the state transition set as a transition destination, obtaining a combination of records corresponding to the search pattern query from additional information of a state transition which has reached the end state; and
    output means for outputting the obtained combination of records as a search result.

4. A propagation signal propagating a program to a computer for searching for a combination of records from a set of records consisting of a plurality of attributes, the program enabling the computer to perform;
    extracting order relation among a plurality of events, each of which defines that a predetermined attribute of a record has a predetermined value, the order relation defined based on an order of an attribute value, from a search pattern query that includes a repetition of an event and that is designated using the plurality of events and the order relation, and converting the extracted order relation into a deterministic finite automaton;
    repeating a process of reading into a memory one or more records positioned in a same order position from the set of records, of checking whether or not a state transition can be performed by the deterministic finite automaton using the read records, and of registering in a state transition set a transition destination of a possible state transition and additional information indicating a record enabling the possible state transition;

obtaining a combination of records corresponding to the search pattern query from additional information of a state transition which has reached an end state of the deterministic finite automaton when the end state is registered in the state transition set as a transition destination; and outputting the obtained combination of records as a search result.

5. A computer-readable recording medium recording a program for enabling a computer that searches for a combination of records from a set of records consisting of a plurality of attributes, to perform:

extracting order relation among a plurality of events, each of which defines that a predetermined attribute of a record has a predetermined value, the order relation defined based on an order of an attribute value, from a search pattern query that includes a repetition of an event and that is designated using the plurality of events and the order relation, and converting the extracted order relation into a deterministic finite automaton;

repeating a process of reading into a memory one or more records positioned in a same order position from the set of records, of checking whether or not a state transition can be performed by the deterministic finite automaton using the read records, and of registering in a state transition set a transition destination of a possible state transition and additional information indicating a record enabling the possible state transition;

obtaining a combination of records corresponding to the search pattern query from additional information of a state transition which has reached an end state of the deterministic finite automaton when the end state is registered in the state transition set as a transition destination; and outputting the obtained combination of records as a search result.

6. The recording medium according to claim 5, wherein the program further enables the computer to perform:

extracting a restriction among events other than the order relation from the search pattern query; and checking whether or not the record enabling the possible state transition satisfies the restriction.

7. The recording medium according to claim 5, wherein the search pattern query is a search pattern query including a repetition of an event which does not continuously occur.

8. The recording medium according to claim 5, wherein said outputting outputs detected combination of records every time a combination of records corresponding to the search pattern query is detected.

9. The recording medium according to claim 5, wherein said obtaining performs pattern matching using one of processes of longest match which returns a combination of records with a longest interval of events among combinations of records matching the search pattern query, of shortest match which returns a combination of records with a shortest interval of events among combinations of records matching the search pattern query, of first match which returns a first combination of records matching the search pattern query, and of all match which returns all combinations of records matching the search pattern query.

10. The recording medium according to claim 5, wherein said outputting compiles information about the combination of records corresponding to the search pattern query in a designated format and outputs the compiled information.

11. The recording medium according to claim 5, wherein the program further enables the computer to perform an aggregating function for the combination of records corresponding to the search pattern query and outputting a result of the aggregating function.

12. The recording medium according to claim 5, wherein said repeating sorts the set of records by values of a designated attribute, and searches a sorted set of records.

13. The recording medium according to claim 12, wherein said repeating groups the set of records by values of a designated attribute, and sorts records of each group.

* * * * *

UNITED STATES PATENT AND TRADEMARK OFFICE
CERTIFICATE OF CORRECTION

PATENT NO. : 6,912,526 B2  
DATED : June 26, 2005  
INVENTOR(S) : Naoki Akaboshi It is certified that error appears in the above-identified patent and that said Letters Patent is hereby corrected as shown below:

<u>Column 16,</u>
Line 50, delete "perform;" and insert -- perform: --.

Signed and Sealed this

Twenty-third Day of May, 2006

JON W. DUDAS  
*Director of the United States Patent and Trademark Office*

UNITED STATES PATENT AND TRADEMARK OFFICE
CERTIFICATE OF CORRECTION

PATENT NO.    : 6,912,526 B2
DATED         : June 28, 2005
INVENTOR(S)   : Naoki Akaboshi It is certified that error appears in the above-identified patent and that said Letters Patent is hereby corrected as shown below:

<u>Column 16,</u>
Line 50, delete "perform;" and insert -- perform: --.

This certificate supersedes Certificate of Correction issued May 23, 2006.

Signed and Sealed this

Thirteenth Day of June, 2006

JON W. DUDAS
*Director of the United States Patent and Trademark Office*